United States Patent [19]

Weems et al.

[11] 4,228,132
[45] Oct. 14, 1980

[54] HYDROGEN-OXYGEN RECOMBINER

[75] Inventors: Sterling J. Weems, Chevy Chase, Md.; Harold W. McCurdy, Jr., Vienna, Va.

[73] Assignee: Westinghouse Electric Corp., Pittsburgh, Pa.

[21] Appl. No.: 878,850

[22] Filed: Feb. 17, 1978

Related U.S. Application Data

[60] Division of Ser. No. 686,437, May 14, 1976, Pat. No. 4,139,603, which is a continuation of Ser. No. 387,418, Aug. 10, 1973, abandoned.

[51] Int. Cl.² .......................... G21C 9/00; C01B 5/00
[52] U.S. Cl. ..................................... 422/174; 422/62; 422/117; 422/159; 422/199; 176/37; 423/580
[58] Field of Search ................. 422/62, 117, 159, 174, 422/199; 176/37; 423/580

[56] References Cited

U.S. PATENT DOCUMENTS

| | | |
|---|---|---|
| 1,925,784 | 9/1933 | Williams . |
| 1,957,254 | 5/1934 | Eymann ............................... 422/199 |
| 3,028,327 | 4/1962 | Weeks ..................................... 176/37 |
| 3,052,613 | 9/1962 | Wigner et al. ......................... 176/37 |

OTHER PUBLICATIONS

Nuclear Eng. Handbook, 1st Ed., 1958, Editor Harold Etherington, pp. 13–(68), 13–(69).

*Primary Examiner*—Harvey E. Behrend
*Attorney, Agent, or Firm*—L. A. DePaul; Z. L. Dermer

[57] ABSTRACT

An apparatus for efficiently and safely recombining hydrogen and oxygen gas to form water vapor, the apparatus being particularly adapted for use with a nuclear reactor system in which potentially dangerous hydrogen gas, evolved within the containment vessel during certain postulated accident conditions, can be eliminated. Further, this apparatus also aids in the removal of certain radioactive contaminants from the gases in a containment vessel.

4 Claims, 7 Drawing Figures

HYDROGEN-OXYGEN RECOMBINER

This is a division of application Ser. No. 686,437 filed May 14, 1976, now U.S. Pat. No. 4,139,603, which in turn is a continuation of application Ser. No. 387,418 filed Aug. 10, 1973, now abandoned.

BACKGROUND OF THE INVENTION

The commercial electric power generating nuclear reactor has become an important means of meeting the power requirements of present day society. In designing such nuclear reactors, every effort is made to prevent accidental discharge of even trace amounts of radioactive materials into the environment. The safety systems which are used to prevent improbable yet postulated accidents must be efficient and operate with absolute reliability.

Most present day nuclear reactors employ water as a coolant for the reactor. In designing such systems, provision must be made for a loss-of-coolant accident, however remote the possibility of such an occurance. In the unlikely event of such an accident, the nuclear plant containment system will contain any radioactive material released from the reactor vessel itself, as well as withstanding any pressure surges in the system. The containment system itself, of course, isolates the entire nuclear system from the environment. Following a major loss-of-coolant accident in a water cooled reactor, hydrogen may be generated within the reactor containment system by the mechanisms of radiolysis, zirconium-water reaction, and by corrosion of the metal elements. The containment system atmosphere will be radioactive and necessarily sealed within the system for an extended period or time until this atmosphere can be cleansed of its radioactivity otherwise reduced, to prevent the release of any radioactive contamination to the environment. Provision must therefore be made to limit the hydrogen concentration contained in the containment system, to avoid any dangerous buildup of hydrogen gas.

Hydrogen gas is also utilized in a number of other systems typically associated with water cooled reactors, and is particularly used in removing fission product gases from an interface with the primary coolant water whereby hydrogen carrier gas is used to strip the fission products from the coolant. The use of hydrogen gas in a water coolant system is also shown in U.S. Pat. No. 3,362,883, owned by the assignee of the present invention.

SUMMARY OF THE INVENTION

The present invention provides an efficient and reliable hydrogen-oxygen recombiner for safely recombining these gates to form water vapor. The invention further serves to help cleanse the containment atmosphere of certain radioactive chemicals which are otherwise very difficult to remove. Specifically, the heating of the containment atmosphere to a temperature of about 1400° F. in the recombiner will cause a breakdown of radioactive methyl iodide by pyrolysis into products which may be readily absorbed by containment sprays and other means. The recombiner comprises a frame having inlet openings through which the hydrogen and oxygen are admitted and outlet openings through which the water vapor is passed. An electrical heating element is disposed within the frame and adapted to be operated at a power density sufficient to heat the gases within the frame to a temperature sufficient to combine the hydrogen and oxygen to form water vapor.

The recombiner of the present invention is particularly adaptable for use within a containment vessel of a nuclear reactor system to maintain the hydrogen gas level within the containment vessel at a safe level.

The recombiner of the present invention has numerous significant advantages in that the system requires no moving parts and eliminates the need for combustible fuel. The recombiner can be readily placed in the containment vessel, with the control system outside the containment vessel, and the operability of the recombiner can be periodically checked to verify its operation.

It is important to note that while an electric filament ignitor has been used in the prior art to safely ignite hydrogen gas exiting from a hydrogen atmosphere furnace into an air filled chamber, the hydrogen concentrations in such operation are well above the four volume percent hydrogen lower limit of inflammability in air, so that the filament with its inherently very small surface area is merely used to produce an initial localized heating of the hydrogen passing in close proximity to the filament surface, which localized heating is sufficient to initiate flammable combustion of the hydrogen. Such flammable combustion will propagate itself at such high hydrogen concentration and will proceed at a very high temperature similar to a hydrogen torch which operates at about 2400° F.

In the recombiner of the present invention, particularly when it is used in combination with a nuclear reactor containment system to limit the hydrogen concentration of the containment atmosphere, the hydrogen concentration will be maintained at below four volume percent and will be preferably maintained at about two volume percent or less. Thus, in order to effect combination of hydrogen and oxygen at these low hydrogen concentrations, a heater assembly is provided which heats the entire volume of gas passing through the heater assembly to a temperature sufficient to effect the combination to form water vapor. It has been found that heating the gas to a temperature of at least about 1150° F. in the heater assembly described, ensures almost total hydrogen-oxygen recombination.

DESCRIPTION OF THE PREFERRED EMBODIMENT

Figure 1:
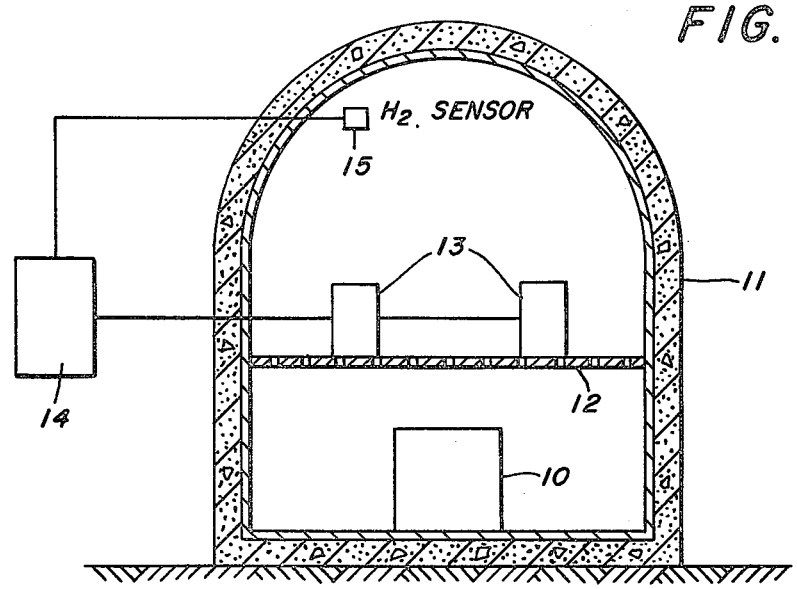
FIG. 1 is a schematic representation of a nuclear containment vessel with the recombiner of the present invention disposed therein.

The invention can best be understood by reference to the exemplary embodiments in the drawings. In FIG. 1 a nuclear reactor 10 and its associated coolant system are disposed within a containment vessel 11 which is designed to contain radioactive emissions to prevent their evolution into the environment following an accident. A work platform 12 supported above the reactor vessel 10 provides a convenient place for disposing the recombiners 13 within the containment vessel 11. The work platform 12 does not interfere with free convective flow of the containment atmosphere. The recombiners 13 are electrically connected to the power supply and control system 14 disposed outside the containment vessel. It may be desirable to provide a conventional hydrogen gas sensor 15 within the containment vessel and to use this hydrogen sensor 15 for controlling operation of the recombiners. Two such recombiners 13 are shown disposed within the containment vessel 11 to provide a back-up system with only one actually being needed to remove the hydrogen gas. The typical concentration of hydrogen gas which might be expected within the containment vessel would be on the order of two to four volume percent hydrogen, and it is desired that the recombiners be designed to limit the hydrogen level to about four volume percent or less.

Figure 2:
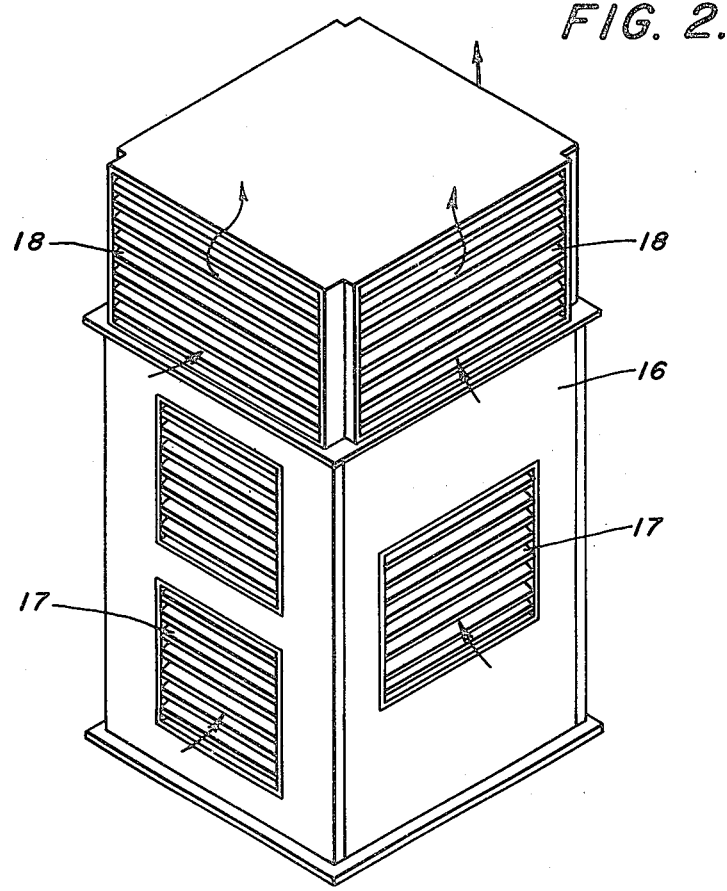
FIG. 2 is a perspective view of the preferred embodiment of the recombiner of the present invention.
Figure 3:
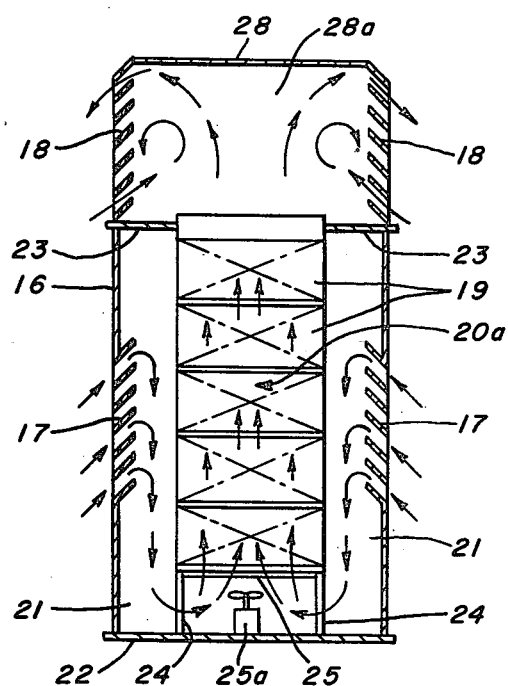
FIG. 3 is a view in section of the recombiner shown in FIG. 2.
Figure 4:
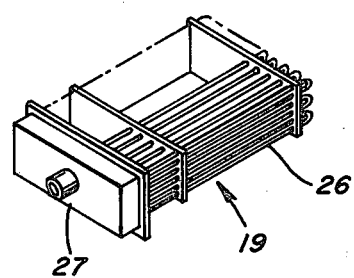
FIG. 4 is an enlarged view of the heater elements used within the recombiner of FIGS. 2 and 3.

The recombiner 13 is seen in greater detail in FIGS. 2, 3, and 4. The recombiner 13 comprises an outer frame 30 16 with louvered intake vents 17 proximate the bottom of the frame, and louvered outlet vents 18 proximate the top of the frame. The louvering of the vents 17 and 18 is to minimize the intake of water spray into the recombiner. Water spray including certain chemicals may be present in certain containments due to utilization of spray systems for fission product removal from the containment air. Electric heating elements 19 are centrally disposed within the frame 16. A shroud or inner frame 20 is disposed about the electric heater elements 19, and is the preferred embodiment, has a generally rectangular cross section. The shroud or inner frame 20 is spaced from the outer frame 16 to provide a preheater section 21. The preheater section 21 is further defined by the bottom plate 22 and top plate 23. Heater support members 24 extend vertically from the bottom plate 22 and support the shroud or inner frame 20 as well as the heater elements 19. An orifice plate 25 is provided at the bottom of the shroud or inner frame 20 through which the hydrogen containing gas is convectively admitted to the recombiner zone 20a defined by the shroud 20 and the orifice plate 25. Means 25a for producing forced convective gas flow through the recombiner may be provided at orifice plate 25 or other convenient locations.

The electric heating elements 19 comprise five heater sections within the shroud 20. One such heater is shown in FIG. 4 having a generally rectangular configuration. Each of the five vertically stacked heaters is made up of an assembly of U-shaped sheathed heating elements 26. The U-shaped elements 26 are assembled in groups of three vertical rows of twenty heaters per row, with a total of sixty U-shaped elements making up each of the five heater sections. Sufficient spacing is provided between the rows of U-shaped elements 26 to allow for a gas throughput of approximately 100 cubic feet of gas per minute at standard temperature and pressure (100 S.C.F.M.). The U-shaped heaters 26 are connected at junction box 27 to the electrical power supply line, (not shown).

The total heater surface area of the metal sheaths of the 300 units being about 175 square feet. Such a heater assembly can process about 100 cubic feet of air per minute at standard temperature and pressure. The heater assembly is operated at about 43 kilowatts power input, and will heat air entering at the air intake louvers at from 80° to 112° F. to a temperature of at least 1150° F. at the exit of the heater section to ensure combination of the hydrogen and oxygen to form water vapor. The gas temperature at the exit of the heater is preferably from about 1150° F. to 1400° F. Higher temperatures are not required, and it is desirable to maintain the gases within this temperature range. The metallic sheath for these heaters is an iron-nickel alloy which is stable and non-reactive at high operating temperatures. The inner frame or shroud must be also formed of a high temperature resistant material, again preferably an iron-nickel alloy.

The individual heating elements used are a standard type of heater which have an operative power rating of about 3 kilowatts per square foot of heater sheath surface. It is desirable that the heating of the gas be achieved at a low power density for the heaters in order to insure long life, so that typically the heaters are operated at a power density of about 0.26 kilowatts per square foot of heater sheath surface. This power density is less than about ten percent of the recommended operating power density.

It is apparent that failure of some of the individual heating elements will have very little effect upon the operation of the recombiner. The recombiner would be typically cycled in the order of once a day, or once every several days, during the sealed containment period after a reactor accident, and this sealed period would be expected to last on the order of one hundred days. Thus, reliability of the overall heater is very important.

It is desirable to use different power density for each of the five heater units, with the power density of the bottom heaters of the stacked five heater unit assembly being operated at the higher power density. This arrangement provides maximum overall power density with minimum heater temperature which is consistent with maximum reliability. This is possible since the gas flow is such that the highest power density heaters are cooled with intake gases which are at relatively low temperature, and because the recombination of hydrogen and oxygen, into water vapor is an exothermic reaction, and less heat from the topmost heaters is needed as the reaction proceeds within the recombination zone. In some cases, it may even be desirable to provide a water jacket cooling system proximate the upper end of the heater assembly. Of course, the heater assembly and power density must be varied to suit the amount of gas which is to be processed.

The heated, water vapor containing gas exits the recombiner zone 20a at the top and passes into a cooling zone 28a which is defined by the top portion 28 of the outer frame 16, the louvers 18, and by plate 23. Louvers 18 are provided through the top portion 28a of the outer frame 16, with the lower portion of the louvers 18 admitting cooling air into the cooling zone 28a, where this air mixes with the heated gas from the recombiner zone 20a, with the cooled mixture exiting through the topmost louvers 18.

The convective path of the gas through the recombiner is shown by the arrows in FIG. 3. In this embodiment, the gas flow is by natural convection, but it is apparent that forced convective means can also be used to move gas through the recombiner.

The preheater section 21 is conductively heated through shroud 20 so that the gas therein is brought to about 250° F. at which temperature it enters the bottom of the recombiner section 20a. Such preheating dries the gas thereby exposing the heaters to pre-dried gas which is least corrosive and least likely to form deposits on the heaters. This arrangement makes for more efficient heat utilization by regenerative heating of the intake gas.

Testing of laboratory models of the recombiner of the present invention verifies that the recombination of hydrogen and oxygen takes place as a result of heating the gases rather than due to any catalytic effect from the metal sheath of the heaters. This was verified by passing hydrogen and inert nitrogen through the heaters to bring the hydrogen to a high temperature, and introducing oxygen downstream of or remote from the main recombiner heaters. The recombination was effected only when the oxygen was introduced. Since the recombiner of the present invention does not use catalytic activity, poisoning of the unit by fission products or by deposition of other chemical products is not a problem. For a typical containment vessel volume, the recombiner unit is designed to operate at about 43 kw.

Figure 5:
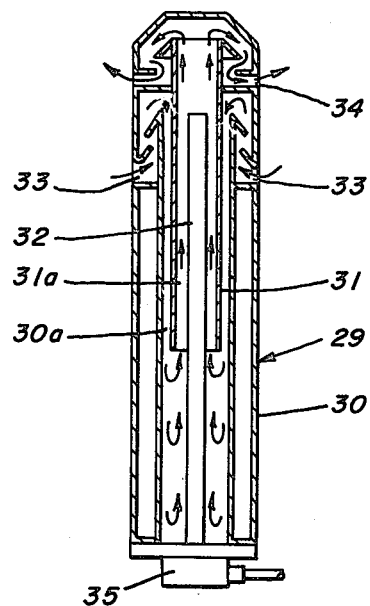
FIG. 5 is a sectional view of another embodiment of the recombiner of the present invention.

Another embodiment of a recombiner of the present invention is shown in FIG. 5. This unit is typically for use in a small volume which requires a much lower power input. The recombiner unit 29 has a generally cylindrical configuration with a cylindrical outer wall 30 and a concentric cylindrical shroud 31 centrally disposed within the outer wall 30 and spaced therefrom. The sheathed heating element 32 is centrally disposed within the inner shroud 31. Once again, inlet flow orifices 33 are provided through the outer wall 30 and a preheater zone 30a is provided between the outer wall 30 and the inner shroud 31, with the inner shroud 31 defining the recombination zone 31a about the heating element 32. Exhaust orifices 34 are likewise provided through the outer wall proximate the top of the outer wall 30. Electrical connection to the heating element 32 is made at junction box 35. The electric hydrogen-oxygen recombiner of the present invention has the advantage of requiring no moving parts, no fuel, and no control system within the containment vessel. Testing of such systems indicates that essentially 100% of theoretical recombination of hydrogen or oxygen is accomplished with the present system regardless of the concentration of hydrogen or oxygen in the gas intake mixture. Propagation of a flame is not required since the entire gas flow through the recombiner zone is heated to a temperature above the reaction temperature for hydrogen and oxygen.

Figure 6:
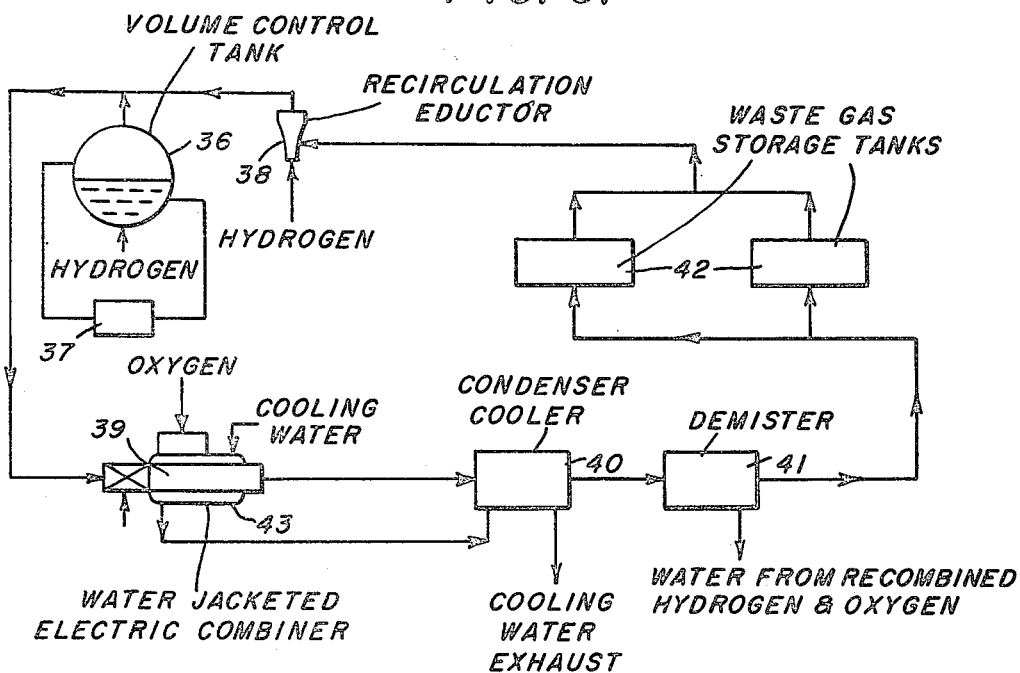
FIG. 6 is a schematic representation wherein the recombiner of the present invention is used in combination with the waste gas treatment system of a water cooled nuclear reactor.

The recombiner of the present invention can also be used in a variety of other hydrogen and oxygen gas systems such as that schematically shown in FIG. 6, which shows its use with a nuclear reactor waste gas treatment system. The use of hydrogen gas to strip fission gas products from the primary coolant fluid is well-known in the art, and occurs in the chemical volume control tank 36 which is connected in the primary coolant loop 37 of the nuclear reactor. A recirculation eductor 38 is used in this system as the flow motive means. Hydrogen and fission gas products are directed to the electrical hydrogen-oxygen recombiner 39 of the present invention and are heated to a temperature above the hydrogen-oxygen recombination temperature, with oxygen being supplied to the recombiner from an auxiliary oxygen supply source. The hydrogen and oxygen recombine as water vapor and the water vapor along with the fission gas products are directed to a condenser-cooler 40, and a demister 41, where a substantial portion of the water vapor is removed. The exhaust from the demister is primarily the fission gas products with some small percentage of steam and hydrogen. The fission gas is directed into waste gas storage tanks which allow for isolation of the fission products. The waste gases can be stored in these tanks at a low pressure, compressed into high pressure gas bottles, or stored in large storage tanks and recirculated back to the recombiner if desired. Such a recycling is shown in the schematic representation of FIG. 6 with the outlet of the waste gas storage tanks being connected to the recirculation eductor. In the embodiment shown in FIG. 6, the recombiner is provided with a water jacketing cooling system 43.

Figure 7:
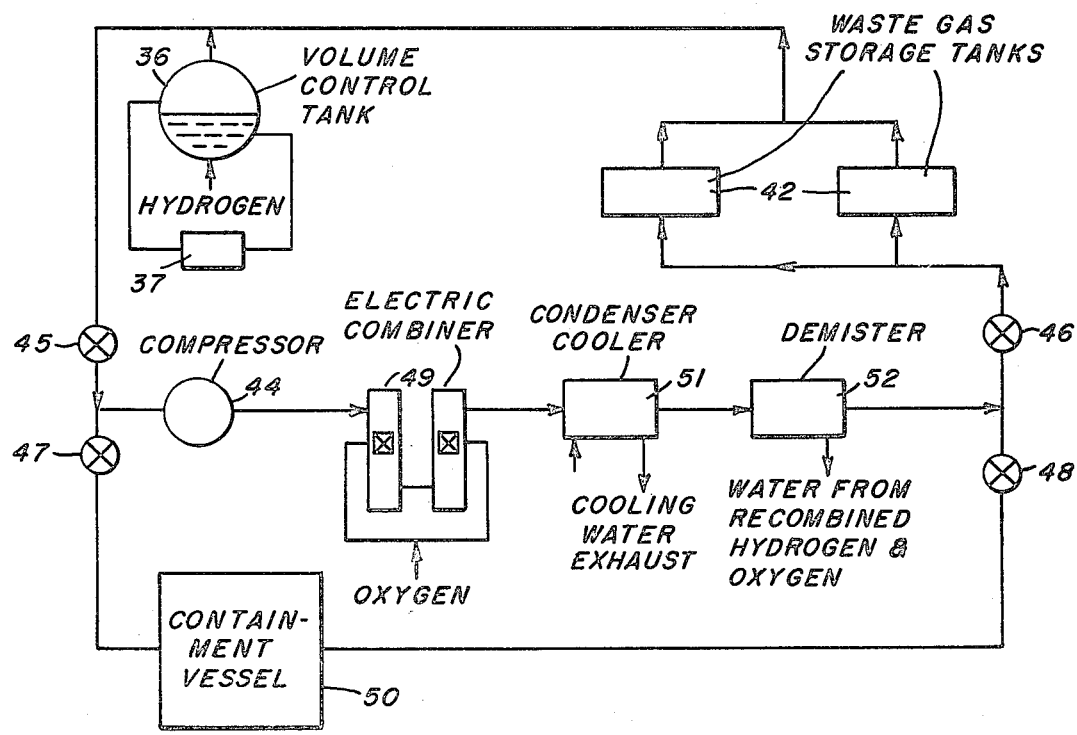
FIG. 7 is a schematic representation wherein the recombiner of the present invention is adapted for use in treating waste gases of the reactor during normal operation, and whereby the recombiner is also utilized for treating the containment atmosphere following a loss-of-coolant accident.

In FIG. 7 the recombiner of the present invention is schematically shown in combination with a waste gas treatment system during normal operation of the nuclear reactor, and with means for connection to the primary containment vessel following a loss-of-coolant accident for use in controlling the hydrogen concentration within the containment vessel. During normal operation of the nuclear reactor, the recombiner is connected in a system which is essentially the same as that shown in FIG. 6, but with a compressor 44 used as the flow motive means. In the event of a loss-of-coolant accident, valves 45 and 46 respectively closed to isolate the waste gas system from the recombiner, and valves 47 and 48 are respectively opened which connect the recombiner 49 with the containment vessel 50. Thus, following a loss-of-coolant accident, the containment atmosphere would be cycled through the electric recombiner 49, and its associated condenser-cooler 51, and demister 52. The water vapor generated in the recombiner is returned to the containment atmosphere.

In the system shown in FIG. 7, the recombiner is disposed outside the reactor containment vessel, and the compressor and high pressure piping are used to conduct the containment atmosphere through the recombiner. It is likewise possible to dispose the recombiner in each instance inside of the containment vessel, but it is preferably disposed outside.

While the present invention has been described in the examples with a recombiner structure which preferably includes a preheater and cooling sections in addition to the recombination section, the recombination of hydrogen and oxygen only requires provision for the recombination section within which the gases are heated to form water vapor.

The recombiner of the present invention can also be used in combination with the water coolant system described in aforementioned U.S. Pat. No. 3,362,883.

In the embodiments which have been described, the containment atmosphere was presumed to have been air, thus containing sufficient oxygen to combine with the hydrogen evolved to form water vapor. It is, of course, possible to use an inert gas containment atmosphere, and in this instance, oxygen would have to be supplied from an auxiliary gas supply source to the electric recombiner so that the hydrogen and oxygen would be combined into water vapor. It is also customary to use an inert carrier gas, such as nitrogen, in waste gas treatment systems, and such gas can readily be accommodated within a system utilizing the present recombiner.

The recombiner of the present invention can also be used in oxygen gas containing systems where it is desired to purge or maintain the oxygen content below some predetermined level. In such a system the oxygen gas containing atmosphere would be heated using a recombiner of the present invention, with hydrogen gas being admitted to the recombiner from a hydrogen gas source. The oxygen and hydrogen are heated to greater than about 1150° F. to effect combination as water vapor.

It is apparent that when one of the gases, hydrogen or oxygen, is not present in the atmosphere to be treated, it must be had from an auxiliary gas supply to be admixed with the other gas. The gas from the auxiliary gas supply can be admixed with the primary gas to be treated before passing the gases over the heating elements, or it can be admixed after the primary gas is heated by passing over the heating elements, just so the admixed hydrogen and oxygen containing gases are at a temperature of greater than about 1150° F.

We claim:

1. A hydrogen-oxygen recombiner for use in a nuclear reactor system to combine hydrogen gas and oxygen gas thereby forming water vapor without the use of a catalyst or a spark device comprising:

a frame defining an inlet zone and a recombination zone for directing a fluid including hydrogen gas and oxygen gas into said inlet zone where said fluid is preheated to about 250° F. thereby drying said fluid as said fluid passes therethrough and thus preventing corrosive damage to said apparatus; and a plurality of electric heating elements disposed in said recombination zone with the power density of each succeeding electrical heating element being less than the preceding one for heating said fluid to a temperature of about 1150° to 1400° F. to thereby combine the hydrogen gas and oxygen gas into water vapor.

2. The hydrogen-oxygen recombiner according to claim 1 wherein said plurality of electric heating elements comprise at least five vertically stacked U-shaped heating elements disposed in said recombination zone.

3. The hydrogen-oxygen recombiner according to claim 2 wherein each of said U-shaped heating elements are assembled in groups of three vertical rows of twenty heaters per row with sufficient spacing provided between the rows of said U-shaped heating elements to allow for approximately 100 cubic feet per minute of said fluid at standard temperature and pressure to flow therethrough.

4. The hydrogen-oxygen recombiner according to claim 3 wherein said hydrogen-oxygen recombiner is operated at about forty-three kilowatts power input.

* * * * *